United States Patent
Lee et al.

(10) Patent No.: US 9,244,540 B2
(45) Date of Patent: Jan. 26, 2016

(54) OPTICAL MINI-MOUSE

(71) Applicant: PIXART IMAGING INC., Hsin-Chu County (TW)

(72) Inventors: Yin-Hui Lee, Hsin-Chu County (TW); Chun-Wei Chen, Hsin-Chu County (TW); Yen-Min Chang, Hsin-Chu County (TW)

(73) Assignee: Pixart Imaging Inc., Hsin-Chu County (TW)

( * ) Notice: Subject to any disclaimer, the term of this patent is extended or adjusted under 35 U.S.C. 154(b) by 83 days.

(21) Appl. No.: 14/144,914

(22) Filed: Dec. 31, 2013

(65) Prior Publication Data

US 2014/0375565 A1     Dec. 25, 2014

(30) Foreign Application Priority Data

Jun. 20, 2013 (TW) .............................. 102121888 A

(51) Int. Cl.
    *G06F 3/033*     (2013.01)
    *G06F 3/0354*     (2013.01)
    *G06F 3/03*     (2006.01)

(52) U.S. Cl.
    CPC .......... *G06F 3/03543* (2013.01); *G06F 3/0317* (2013.01)

(58) Field of Classification Search
    CPC ................ G06F 2203/0335; G06F 2203/0336; G06F 3/0304; G06F 3/0312; G06F 3/0317; G06F 3/033; G06F 3/0354
    See application file for complete search history.

(56) References Cited

U.S. PATENT DOCUMENTS

| | | | | |
|---|---|---|---|---|
| 5,847,696 A | * | 12/1998 | Itoh et al. | 345/163 |
| 6,304,246 B1 | * | 10/2001 | Kuth et al. | 345/157 |
| 6,369,798 B1 | * | 4/2002 | Yatsu et al. | 345/167 |
| 7,557,795 B2 | * | 7/2009 | Kong et al. | 345/156 |
| 7,724,238 B2 | * | 5/2010 | Daniel et al. | 345/163 |
| 7,764,270 B2 | * | 7/2010 | Shigeno et al. | 345/163 |
| 8,648,805 B2 | * | 2/2014 | Bailen | 345/163 |
| 2003/0160765 A1 | * | 8/2003 | Gordon | 345/163 |
| 2003/0160766 A1 | * | 8/2003 | Gordon | 345/163 |
| 2004/0012568 A1 | * | 1/2004 | Velikov et al. | 345/163 |
| 2004/0095323 A1 | * | 5/2004 | Ahn | 345/166 |
| 2006/0022943 A1 | * | 2/2006 | Johnson et al. | 345/157 |
| 2006/0284845 A1 | * | 12/2006 | Wu et al. | 345/166 |
| 2008/0106523 A1 | * | 5/2008 | Conrad | 345/173 |
| 2008/0284735 A1 | * | 11/2008 | Shim | 345/166 |
| 2009/0231275 A1 | * | 9/2009 | Odgers | 345/157 |
| 2010/0085159 A1 | | 4/2010 | Desjeux et al. | |
| 2010/0188336 A1 | * | 7/2010 | Ng et al. | 345/163 |
| 2011/0169738 A1 | * | 7/2011 | Reigneau | 345/166 |
| 2011/0298711 A1 | * | 12/2011 | Dean et al. | 345/161 |
| 2013/0072771 A1 | | 3/2013 | Gu et al. | |
| 2013/0113705 A1 | * | 5/2013 | Gu et al. | 345/166 |
| 2013/0120262 A1 | * | 5/2013 | Piot et al. | 345/163 |
| 2013/0241835 A1 | * | 9/2013 | Lee | 345/166 |

* cited by examiner

*Primary Examiner* — Joe H Cheng
(74) *Attorney, Agent, or Firm* — Rosenberg, Klein & Lee

(57) ABSTRACT

There is provided an optical mini-mouse including a mouse case and a navigation module. The mouse case includes a valley and a flat region arranged along a length direction and the valley extends along a width direction. When the mouse case is rotated about the valley, the navigation module is configured to detect a rotation.

19 Claims, 7 Drawing Sheets

OPTICAL MINI-MOUSE

CROSS REFERENCE TO RELATED APPLICATION

The present application is based on and claims priority to Taiwanese Application Number 102121888, filed Jun. 20, 2013, the disclosure of which is hereby incorporated by reference herein in its entirety.

BACKGROUND

1. Field of the Disclosure

This disclosure generally relates to an input device and, more particularly, to an optical mini-mouse with easy operation and expanded functions.

2. Description of the Related Art

Peripheral devices of the personal computer system generally include a mouse device served as an interactive interface between a user and the computer system. For example, FIG. 1A shows a conventional mouse device. The user grabs the whole mouse device with his/her palm in order to move the mouse device on a work surface thereby controlling an electronic device accordingly. However, this kind of mouse device has a large size and is not convenient to carry. Therefore, it is not suitable to cooperate with portable devices such as a portable computer or a tablet computer.

In order to allow the mouse device to be carried easily, the industry has proposed a mini-mouse as shown in FIG. 1B. This kind of mini-mouse has a width smaller than 4 cm in order to be operated by a single finger thereon. Although the size of this kind of mini-mouse is significantly reduced and can be carried easily, in actual operation the user still has to use at least three fingers to grab the mini-mouse for moving and the user can get tired easily for a long-time operation.

Accordingly, the present disclosure further provides an optical mini-mouse that has an improved ergonomic design so as to reduce the tiredness of long-time operation as well as expand the operating functions and increase the practicality by detecting a rotation.

SUMMARY

The present disclosure provides an optical mini-mouse that has an operating region capable of accommodating two or three fingers of a user and may be moved or rotated on a work surface so as to increase the operating convenience and expand the operating functions.

The present disclosure provides an optical mini-mouse on an upper surface of which a valley is formed to be served as an operating region such that a user may put his/her fingers in the operating region to easily move or rotate the mouse device on a work surface without getting tired even for a long-time operation.

The present disclosure provides an optical mini-mouse including a mouse case, a navigation module and a finger detection unit. The mouse case includes an operating region and an accommodation space arranged along a length direction, wherein a thickness of the accommodation space is between 0.7 cm and 1.3 cm, a width of the operating region is between 4 cm and 6 cm, and a thickness of the operating region is smaller than the thickness of the accommodation space. The navigation module is disposed inside the accommodation space and configured to detect a movement of the optical mini-mouse with respect to a work surface. The finger detection unit is configured to detect at least one of a click event and a slide event in the operating region.

The present disclosure further provides an optical mini-mouse including a mouse case, a navigation module and a finger detection unit. The mouse case has a width and a length, and a first thickness and a second thickness along a length direction of the length, wherein the width is larger than the length and the second thickness is larger than the first thickness. The navigation module is disposed inside an inner space of a region of the second thickness of the mouse case and configured to detect a movement and a rotation of the optical mini-mouse with respect to the work surface. The finger detection unit is formed in a region of the first thickness of the mouse case and configured to detect at least one of a click event and a slide event.

The present disclosure further provides an optical mini-mouse including a mouse case, a navigation module and a finger detection unit. The mouse case includes a valley and a flat region adjacently arranged along a length direction, wherein the valley extends along a width direction. The navigation module is configured to detect a rotation of the optical mini-mouse with respect to the work surface when the mouse case is rotated about the valley. The finger detection unit is configured to detect at least one of a click event and a slide event of the valley.

In one aspect, the finger detection unit includes at least one mechanical button, a roller, at least one capacitive switch and/or at least one optical switch disposed in the operating region.

In one aspect, the navigation module includes a light source configured to illuminate the work surface through an opening of the mouse case and an image sensor configured to receive reflected light of the work surface through the opening to output image frames.

In one aspect, the operating region is formed as a valley of two sides along the length direction higher than a center part or formed as a tilted surface tilting toward a direction away from the accommodation space.

In the optical mini-mouse according to the embodiment of the present disclosure, the operating region of the mouse case is adapted to accommodate two or three fingers. When a user is operating the optical mini-mouse according to the embodiment of the present disclosure, the user may put his/her palm on the work surface and move the optical mini-mouse easily on the work surface only with his/her fingers without getting tired even after a long-time operation. In addition, the optical mini-mouse according to the embodiment of the present disclosure may be rotated about the operating region (or valley) by fingers so as to expand the operating functions, e.g. controlling the increment or decrement of two-phase parameters such as volume, zooming and scrolling.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
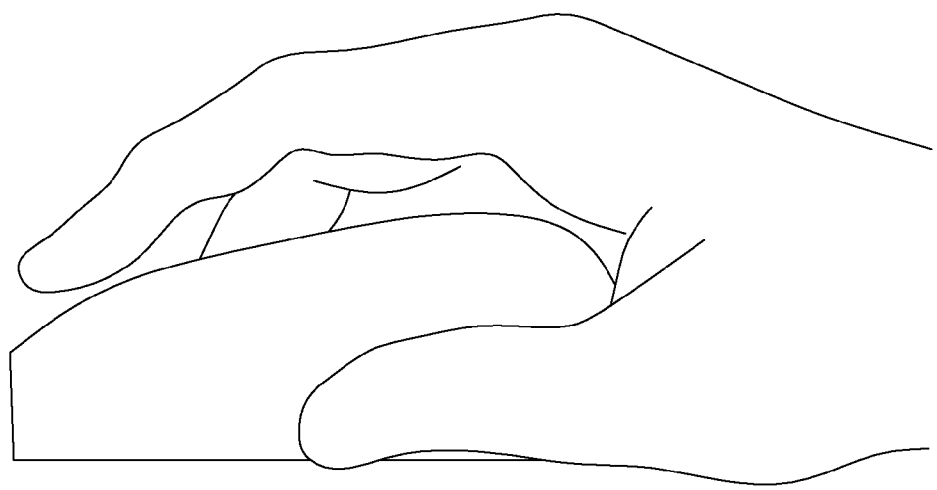
FIG. 1A shows a schematic diagram of the conventional mouse device.
Figure 1B:
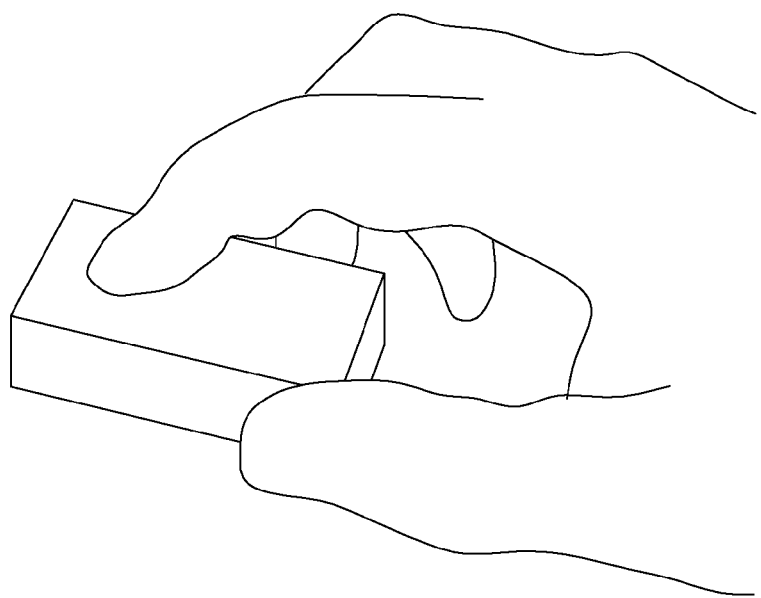
FIG. 1B shows a schematic diagram of the conventional mini-mouse.
Figure 2A:
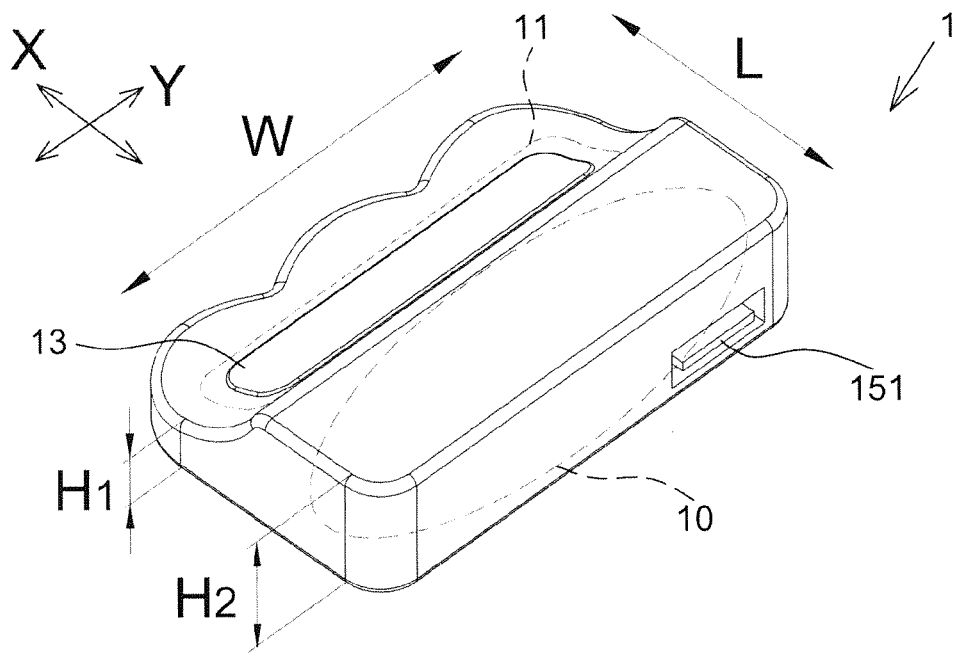
FIGS. 2A and 2B respectively show a perspective view of the optical mini-mouse according to an embodiment of the present disclosure.
Figure 2B:
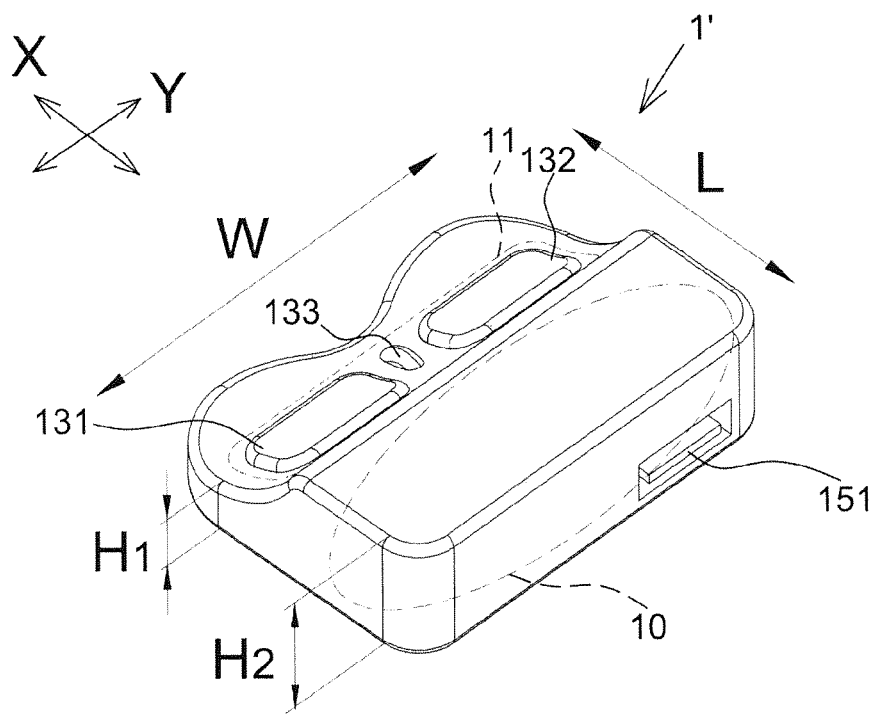
Figure 3:
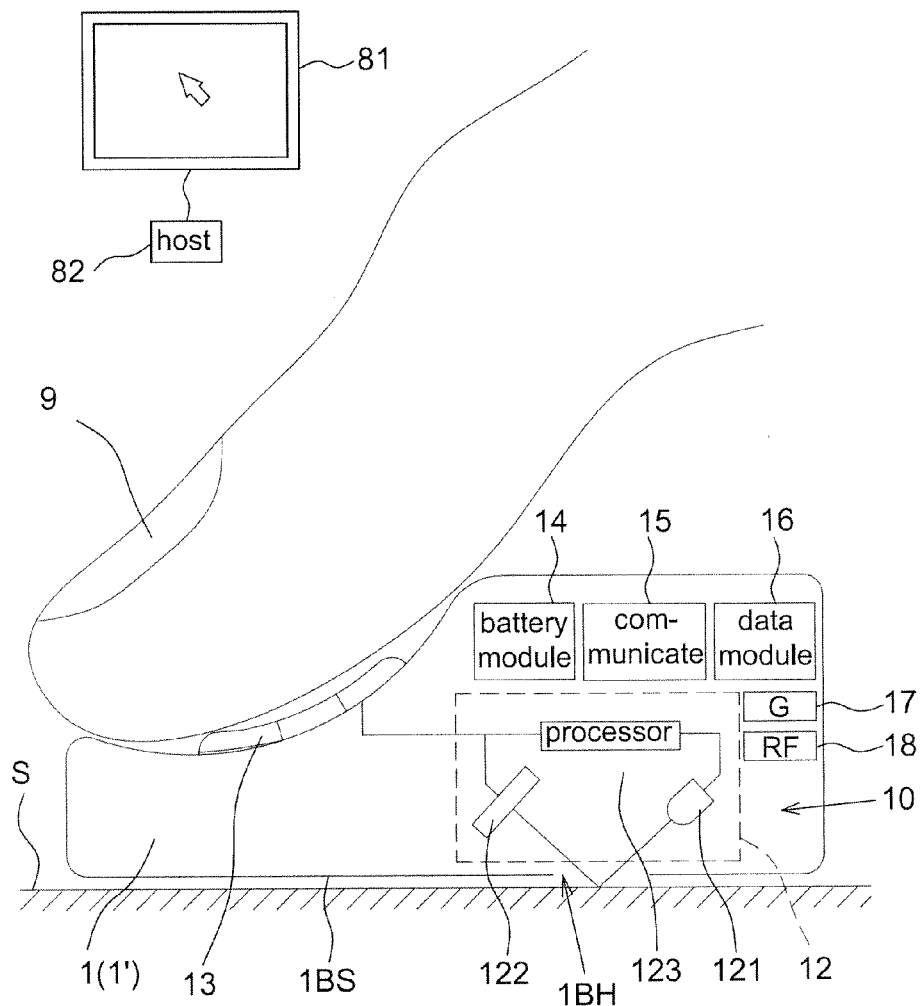
FIG. 3 shows a schematic block diagram of the optical mini-mouse according to an embodiment of the present disclosure.

Referring to FIGS. 2A, 2B and 3, FIGS. 2A and 2B respectively show a perspective view of the optical mini-mouse 1 according to an embodiment of the present disclosure and FIG. 3 shows a schematic block diagram of the optical mini-mouse 1 according to an embodiment of the present disclosure. The optical mini-mouse 1 according to the embodiment of the present disclosure is adapted to be operated by two or three fingers of a user on a work surface S, and includes a mouse case, a navigation module 12 and a finger detection unit 13. The mouse case has a width W and a length L, and has a first thickness H1 and a second thickness H2 along a length direction of the length L (e.g. the X direction in figure), wherein the second thickness H2 is larger than the first thickness H1. In this embodiment, the length L is preferably smaller than the width W thereby reducing as much as possible the device size.

In the embodiment of the present disclosure, in order to conform to ergonomics and reduce the total size as much as possible, the width W is preferably between 4 cm and 6 cm so as to accommodate two or three fingers therein. For example, FIG. 2A shows an embodiment for accommodating three fingers, and thus the width W is preferably between 5 cm and 6 cm; and FIG. 2B shows an embodiment for accommodating two fingers, and thus the width W is preferably between 4 cm and 5 cm. The length L is preferably between 3 cm and 5 cm, wherein the length L may be determined according to the required inner space for accommodating all elements inside the mouse case. The first thickness H1 may be between 0.3 cm and 0.5 cm, wherein the first thickness H1 may be as thin as possible as long as the structure strength can be kept and the finger detection unit 13 (described later) can be disposed. The second thickness H2 may be between 0.7 cm and 1.3 cm, wherein a region of the second thickness H2 is for accommodating most of the elements. The second thickness H2 is also as thin as possible as long as all elements needed in operation, e.g. including a navigation module 12, a battery module 14, a communication interface 15, a data storage module 16, a two-dimensional gravity sensor (G) 17 and/or a RF transceiver module (RF) 18, can be disposed therein. In other words, the width W may be determined according to the number of fingers to be accommodated so that it has a lower limit. The length L is preferably manufactured as short as possible as long as all elements can be accommodated therein so as to reduce the device size as much as possible.

It should be mentioned that although FIGS. 2A and 2B show that a front end of the optical mini-mouse 1 and 1' has a wave shape, the present disclosure is not limited thereto. The front end may be formed as a parabolic or a straight line without particular limitation.

The mouse case has an operating region 11 and an accommodation space 10 arranged along a length direction (e.g. the X direction in figure), wherein the operating region 11 has the first thickness H1 and the width W. The accommodation space 10 is an inner space of a region of the second thickness H2 and thus has the second thickness H2. In one embodiment, in order to allow the user's finger to push/pull the optical mini-mouse 1 on the work surface S easily, the operating region 11 is preferably formed as a valley of two sides along the length direction higher than a center part thereof, and the valley extends along a width direction (e.g. the Y direction in figure). Herein, the first thickness H1 may be an average thickness of the valley. In one embodiment, the surface of the valley may be a rough surface so as to increase the static friction with respect to the finger surface. An upper surface corresponding to a region of the second thickness H2 may be formed as a flat region. However, the present disclosure is not limited thereto, and the upper surface corresponding to the region of the second thickness H2 may also be formed as a curved surface. In another embodiment, the operating region 11 may also be formed as a tilted surface, and a surface of the tilted surface may be a rough surface so as to increase the static friction with respect to the finger surface. In the present disclosure, the width W of the operating region 11 may or may not be identical to that of the accommodation space 10, and the width W of the mouse case may be arranged to monotonically decrease or increase along the length direction.

In another embodiment, upper surfaces of the operating region 11 and the accommodation space 10 are flat surfaces or curved surfaces, and a vertical surface, a tilted surface or a curved surface may be arranged to connect between said two upper surfaces.

Figure 4A:
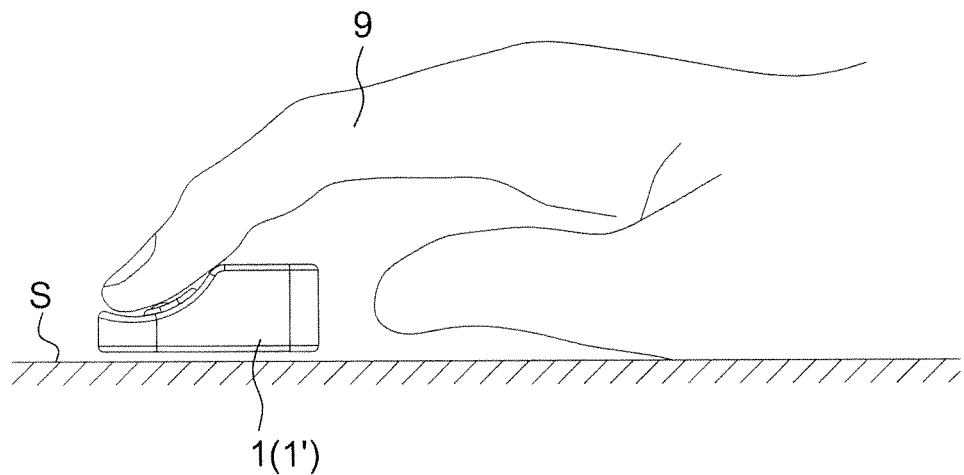
FIGS. 4A and 4B show schematic diagrams of operating the optical mini-mouse according to the embodiment of the present disclosure.
Figure 4B:
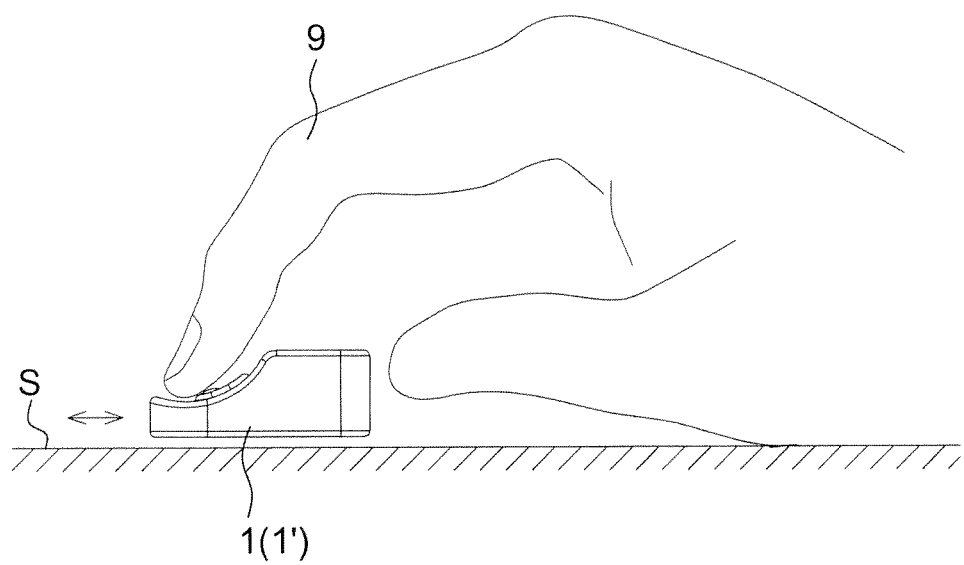

The navigation module 12 is disposed inside the accommodation space 10 and configured to detect a movement of the optical mini-mouse 1 with respect to the work surface S. For example, the navigation module 12 may include a light source 121, an image sensor 122 and a processing unit 123. The light source 121 may be a light emitting diode, a laser diode or other active light sources, and is preferably emit invisible light. The light source 121 is configured to illuminate the work surface S through an opening 1BH at a bottom surface 1BS of the mouse case. The image sensor 122 may be a CCD image sensor, a CMOS image sensor or other optical sensors, and is configured to receive reflected light from the work surface S through opening 1BH and to output image frames. The processing unit 123 may be a digital signal processor and is configured to post-process image frames outputted from the image sensor 122 and calculate a movement (e.g. according to the correlation between images) of the optical mini-mouse 1 with respect to the work surface S according to at least two image frames. For example referring to FIGS. 4A and 4B, the user only needs to put his/her fingers 9 in the operating region 11 and then to bend or stretch fingers 9, the optical mini-mouse 1 can be easily moved on the work surface S. As the palm of the user does not need to be left off or moved on the work surface S, the user does not get tired even after a long-time operation. In addition, the navigation module 12 may further include at least one light guiding element configured to guide the light emitted from the light source 121 and/or the reflected light of the work surface S.

In this embodiment, as the navigation module 12 is disposed inside the accommodation space 10, the opening 1BH on the bottom surface 1BS is opposite to the accommodation space 10 and the upper surface thereof; i.e. the opening 1HB is positioned at the rear half part of the mouse case instead of at the center part. In addition, the bottom surface 1BS is preferably made of material suitable to be moved on the work surface S.

Figure 5A:
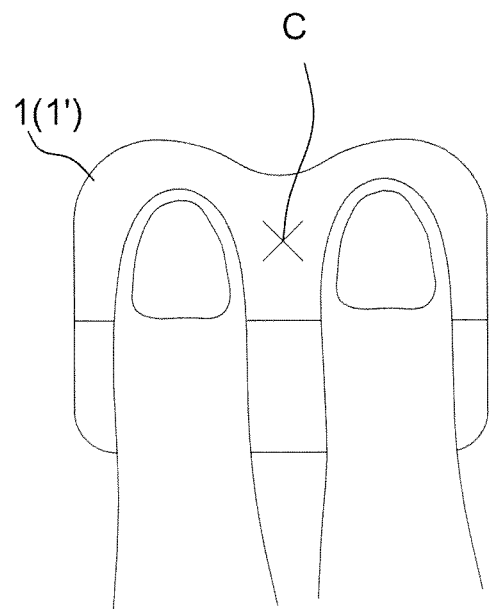
FIGS. 5A to 5C show schematic diagrams of operating the optical mini-mouse according to the embodiment of the present disclosure and the captured image frames.
Figure 5A:
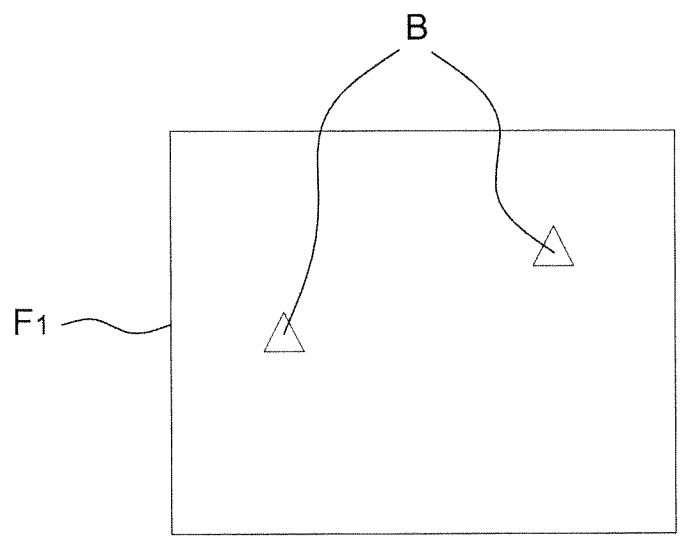
Figure 5B:
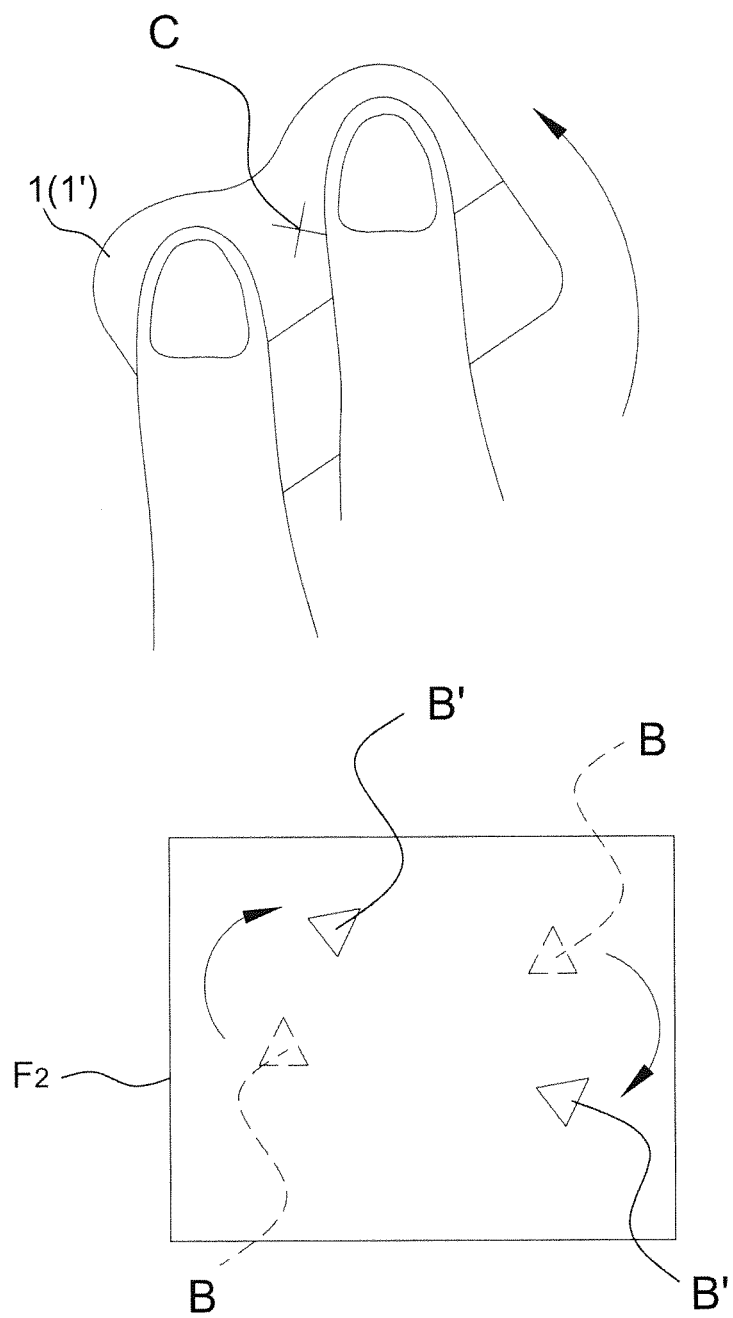
Figure 5C:
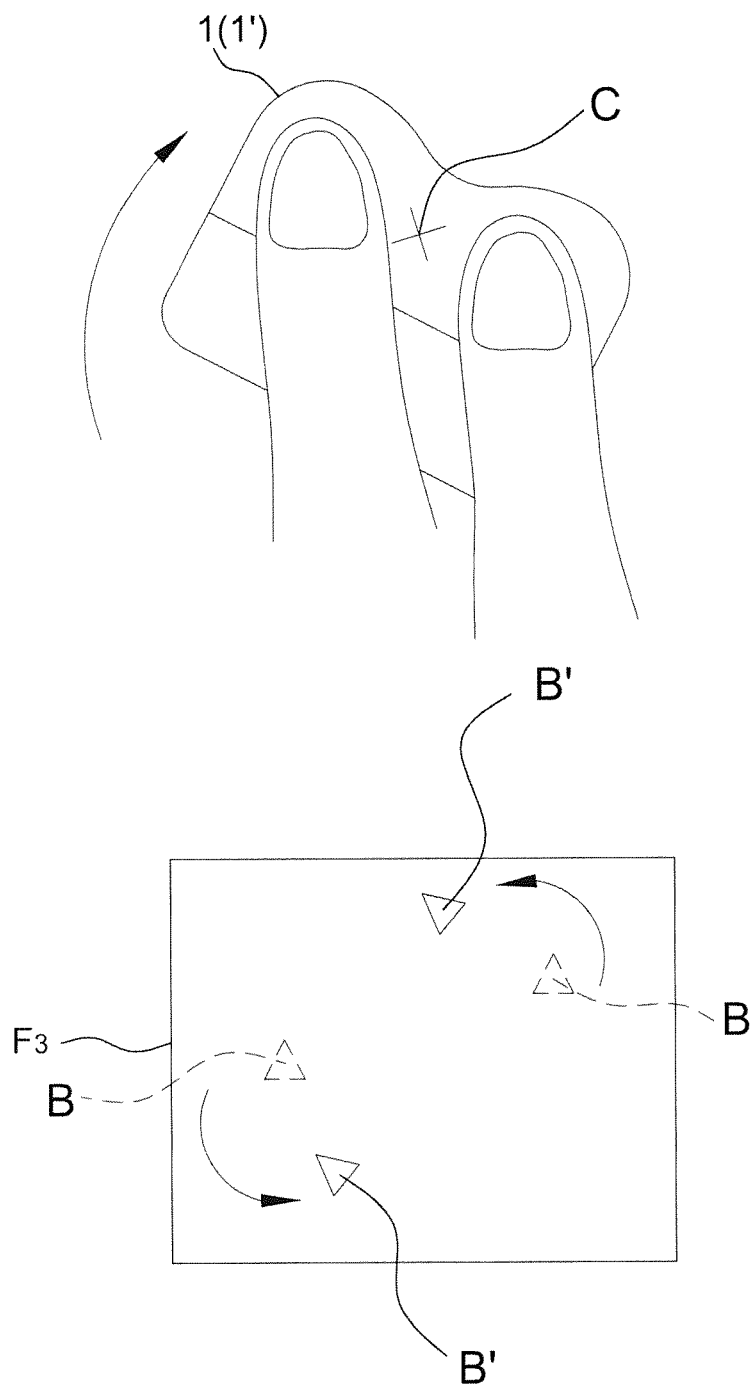

In another embodiment, the navigation module 12 may further be configured to calculate a rotation of the optical mini-mouse 1 with respect to the work surface S according to a plurality of image frames captured by the image sensor 122. For example referring to FIGS. 5A-5C, they show schematic diagrams of the operating state of the optical mini-mouse 1 and the captured image frames, wherein FIG. 5A shows an image frame F1 captured when the optical mini-mouse 1 is not rotated; FIG. 5B shows an image frame F2 captured when the optical mini-mouse 1 is rotated counterclockwise about the operating region 11; and FIG. 5C shows an image frame F3 captured when the optical mini-mouse 1 is rotated clockwise about the operating region 11. The navigation module 12 identifies the position variation of the corresponding brightness features B according to the correlation between image frames to accordingly calculate a rotation; for example, calculating a counterclockwise rotation according to the image frames F1 and F2 or calculating a clockwise rotation according to the image frames F1 and F3. It should be mentioned that in this embodiment the optical mini-mouse 1 is rotated by the finger about the valley (i.e. the finger operating region 11), e.g. rotated substantially about a center C of the valley, instead of being rotated about the center of the optical mini-mouse 1. In addition, numbers and positions of the brightness features B and B' in the image frames F1 to F3 are only intended to describe but not to limit the present disclosure. In addition, although FIGS. 5A to 5C only show the operation with two fingers, the operation with three fingers is similar thereto, i.e. rotated about the operating region 11 so details thereof are not repeated herein.

In another embodiment, the detection of the rotation may be implemented by further employing a two-dimensional gravity sensor 17 or at least one RF transceiver module 18, e.g. RFID module. The method of detecting the rotation with a two-dimensional gravity sensor is well known and thus details thereof are not described herein. In one embodiment, a RF transceiver module 18 may be respectively disposed at two sides of the optical mini-mouse 1 so as to receive signals from a fixed position (for example, but not limited to, a host 82 or a display device 81). When the optical mini-mouse 1 is rotated, the signal strength received by the RF transceiver modules 18 is changed due to the change of distance from the fixed position so that the rotation may be detected accordingly. The RF transceiver module may be used to detect the distance, e.g. referring to EP Patent No. EP2127120A1. For example, a TAG may be respectively disposed at two different positions of a host 82 and the processing unit 123 then calculates distances between the TAGs and a mouse device to accordingly calculate the rotation. It is appreciated that the TAGs are not limited to be disposed on the host 82. If the optical mini-mouse 1 of the present disclosure is a wireless mouse, the RF transceiver module 18 may also be configured to transmit data to and from the host 82.

The finger detection unit 13 is disposed in the operating region 11 and configured to detect a click event and/or a slide event in the operating region 11. For example, the finger detection unit 11 may include at least one mechanical button, a roller, at least one capacitive switch and/or at least one optical switch disposed in the operating region 11.

In one embodiment, the finger detection unit 13 may detect the click event and/or scroll event using a left key 131, a right key 132 and a roller 133 (as shown in FIG. 2B) of the conventional mouse, and the processing unit 123 then relatively controls a host 82 to display the corresponding operation on a display device 81, e.g. functions including the icon selection, screen scrolling and so on.

In another embodiment, the finger detection unit 13 may detect the finger click (e.g. single click, double click or multiple click) using a capacitive switch (e.g. the single region shown in FIG. 2A) and detect the finger slide to be served as the scroll event. In another embodiment, the capacitive switch may be divided into different regions for detecting different fingers (e.g. FIG. 2B), wherein methods of detecting the finger click and slide are well known and thus details are not described herein.

In another embodiment, the finger detection unit 13 may detect the finger click using an optical switch (e.g. the single region shown in FIG. 2A) and detect the finger slide to be served as the scroll event. In another embodiment, the optical switch may be divided into different regions for detecting different fingers (e.g. FIG. 2B). In this embodiment, when the finger detection unit 13 includes an optical switch, the optical switch may share the same light source (e.g. 121) with the navigation module 12 or use a different light source.

It should be mentioned that although FIG. 3 shows that the navigation module 12 and the finger detection unit 13 are coupled to the same processing unit 123, the present disclosure is not limited thereto. The finger detection unit 13 may be coupled to another independent processing unit without sharing the same processing unit with the navigation module 12.

In one embodiment, the optical mini-mouse 1 may communicate with a host 82 through a wireless or wired communication technology, and thus the optical mini-mouse 1 may include a communication interface 15 (e.g. wireless or wired communication interface) disposed inside the accommodation space 10. For example, the optical mini-mouse 1 may further include a USB module, and the optical mini-mouse 1 performs the wired communication when being coupled to the host 82 through a USB interface (e.g. via a communication plug 151), and performs the wireless communication when said wired coupling is decoupled. The wireless or wired communication technologies are well known and thus details are not described herein.

In one embodiment, the optical mini-mouse 1 may include a battery module 14 disposed inside the accommodation space 10 configured to provide the power required in operation. For example, the optical mini-mouse 1 may further include a USB module, and the host 82 may provide the power for operation and charge the battery module 14 when the optical mini-mouse 1 is coupled to the host 82 through a USB interface. In another embodiment, the USB interface may only provide power for operation but the battery module 14 is not charged through the USB interface.

In one embodiment, the optical mini-mouse 1 may include a data storage module 16 disposed inside the accommodation space 10, and thus the optical mini-mouse 1 may be used as a flash disk to read data from or write data to the host 82 through a USB interface or a PS2 interface. Or the optical mini-mouse 1 may perform the wireless data transmission through the channel of the mouse device itself (i.e. the channel for transmitting movement).

In one embodiment, the finger detection unit 13 may further be configured to detect biological characteristics, e.g. including the fingerprint, pulse, blood oxygen and so on. For example, the optical mini-mouse 1 may be limited to be activated by predetermined user(s) through fingerprint so as to increase the data safety. For example, the optical mini-mouse 1 may include an optical finger mouse. The method of detecting the biological characteristics by the finger detection unit H may be referred to U.S. application Ser. No. 13/614, 999 assigned to the same assignee of the present application.

In one embodiment, the navigation module 12 may use an adjustable report rate to report the calculated movement and/or rotation. For example, the value of the report rate may be determined according to the program currently being executed by the host 82. For example, when the host 82 is running a game program, the navigation module 12 may report the movement and/or rotation with a higher report rate; whereas when the host 82 is running a word processing program, the navigation module 12 may report the movement and/or rotation with a lower report rate, wherein the report rate may be adjusted by the user selection or by the optical mini-mouse 1 directly according to a signal sent from the host 2.

In the embodiment of the present disclosure, the accommodation space 10 is arranged at the rear part of the optical mini-mouse 1. Most elements of the optical mini-mouse 1 are disposed inside the accommodation space 10 to allow the gravity center to be at the rare part of the device so as to improve the user experience in operation.

In the embodiment of the present disclosure, the movement calculated by the optical mini-mouse 1 may be used to control a cursor on a display device 81, and the rotation calculated by the optical mini-mouse 1 may be used to control two-phase parameters that have two changing direction, such as volume, zooming and scrolling, without particular limitation. Therefore, when the optical mini-mouse 1 also has the function of detecting the rotation, the roller 133 may not be implemented and the function of the roller 133 may be replaced by the detected rotation; i.e. the finger detection unit 13 may only detect the click event without detecting the slide event.

As mentioned above, the conventional mini-mouse is grabbed by three fingers of a user in order to move on a work surface such that the user is easily get tired after a long-time operation. Therefore, the present disclosure further provides an optical mini-mouse (FIGS. 2A to 2B and 3) that may be moved easily on a work surface when a user naturally puts his/her fingers in an operating region of the mouse device thereby having the merit of easy operation. In addition, the optical mini-mouse may perform rotating operation so as to expand functions and increase the practicality thereof.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical mini-mouse, for being operated on a work surface, the optical mini-mouse comprising:
   a mouse case comprising an operating region and an accommodation space arranged along a length direction, wherein a thickness of the accommodation space is between 0.7 cm and 1.3 cm, a width of the operating region is between 4 cm and 6 cm, and a thickness of the operating region is smaller than the thickness of the accommodation space;
   a navigation module disposed inside the accommodation space and configured to detect a movement of the optical mini-mouse with respect to the work surface; and
   a finger detection unit configured to detect at least one of a click event and a slide event in the operating region.

2. The optical mini-mouse as claimed in claim 1, wherein the finger detection unit comprises at least one of a mechanical button, a roller, a capacitive switch and an optical switch disposed in the operating region.

3. The optical mini-mouse as claimed in claim 1, wherein the operating region is formed as a valley of two sides along the length direction higher than a center part.

4. The optical mini-mouse as claimed in claim 1, wherein a length of the mouse case along the length direction is smaller than the width of the operating region.

5. The optical mini-mouse as claimed in claim 1, wherein the mouse case further comprises a bottom surface having an opening under the accommodation space; and the navigation module comprises a light source illuminating the work surface through the opening and an image sensor receiving reflected light of the work surface through the opening.

6. The optical mini-mouse as claimed in claim 5, wherein the navigation module further calculates a rotation of the optical mini-mouse with respect to the work surface according to a plurality of image frames captured by the image sensor.

7. The optical mini-mouse as claimed in claim 1, further comprising a two-dimensional gravity sensor or at least one RF transceiver module configured to detect a rotation of the optical mini-mouse with respect to the work surface.

8. The optical mini-mouse as claimed in claim 1, wherein the finger detection unit is further configured to detect biological characteristics.

9. The optical mini-mouse as claimed in claim 1, further comprising a battery module disposed inside the accommodation space.

10. The optical mini-mouse as claimed in claim 1, further comprising a wireless communication interface or a wired communication interface.

11. The optical mini-mouse as claimed in claim 1, further comprising a data storage module disposed inside the accommodation space.

12. The optical mini-mouse as claimed in claim 1, wherein the navigation module outputs the movement with an adjustable report rate.

13. An optical mini-mouse, for being operated on a work surface, the optical mini-mouse comprising:
    a mouse case having a width and a length, and a first thickness and a second thickness along a length direction of the length, wherein the width is larger than the length and the second thickness is larger than the first thickness;
    a navigation module disposed inside an inner space of a region of the second thickness of the mouse case and configured to detect a movement and a rotation of the optical mini-mouse with respect to the work surface; and
    a finger detection unit formed in a region of the first thickness of the mouse case and configured to detect at least one of a click event and a slide event.

14. The optical mini-mouse as claimed in claim 13, wherein the width is between 4 cm and 6 cm, the length is between 3 cm and 5 cm, the first thickness is between 0.3 cm and 0.5 cm, and the second thickness is between 0.7 cm and 1.3 cm.

15. The optical mini-mouse as claimed in claim 13, wherein the finger detection unit comprises at least one of a mechanical button, a roller, a capacitive switch and an optical switch.

16. The optical mini-mouse as claimed in claim 13, wherein the mouse case further comprises a bottom surface having an opening corresponding to the region of the second thickness; and the navigation module comprises a light source illuminating the work surface through the opening and an image sensor receiving reflected light of the work surface through the opening.

17. The optical mini-mouse as claimed in claim 13, wherein the region of the first thickness is formed as a valley of two sides along the length direction higher than a center part, and the first thickness is an average thickness of the valley.

18. An optical mini-mouse, comprising:
    a mouse case comprising a valley and a flat region adjacently arranged along a length direction, wherein the valley extends along a width direction;

a navigation module configured to detect a rotation of the optical mini-mouse with respect to the work surface when the mouse case is rotated about the valley; and a finger detection unit configured to detect at least one of a click event and a slide event of the valley, wherein a width of the optical mini-mouse is larger than a length thereof.

19. The optical mini-mouse as claimed in claim 18, wherein the finger detection unit comprises at least one of a mechanical button, a roller, a capacitive switch and an optical switch disposed in the valley.

\* \* \* \* \*